Dec. 7, 1954
H. B. PETERSON
2,696,581
OVERLOAD ACTUATED CONTROL DEVICE
FOR MACHINE DRIVING MECHANISM
Filed April 17, 1952
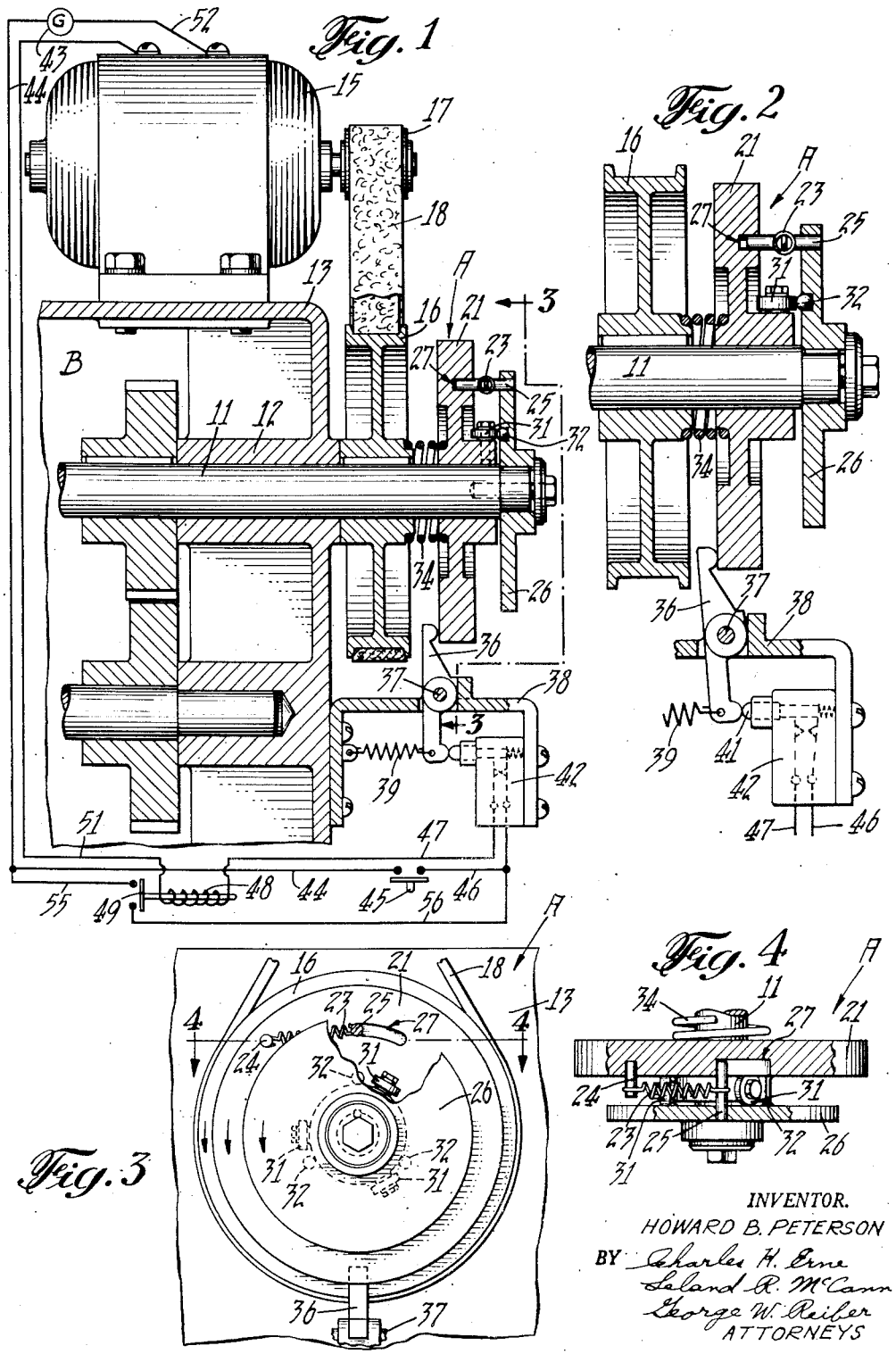
INVENTOR.
HOWARD B. PETERSON
BY Charles H. Erne
Leland R. McCann
George W. Reiber
ATTORNEYS United States Patent Office 2,696,581
Patented Dec. 7, 1954

2,696,581

OVERLOAD ACTUATED CONTROL DEVICE FOR MACHINE DRIVING MECHANISM

Howard B. Peterson, San Francisco, Calif., assignor to American Can Company, New York, N. Y., a corporation of New Jersey Application April 17, 1952, Serial No. 282,912

6 Claims. (Cl. 318—475)

The present invention relates to overload controlled devices or mechanism for machine driving mechanisms and like instrumentalities and has particular reference to an inertia actuated drive control device for stopping the machine driving mechanism when an overload is encountered in the machine.

An object of the invention is the provision of such a control device for the driving mechanism of a machine wherein the driving mechanism will be automatically stopped when an overload on the mechanism is encountered, such as caused by a jam in the machine or a freezing of the machine parts through lack of lubrication or other causes. This is to the end that improper operation of the machine with a resultant damage to the machine parts may be prevented.

Another object is the provision of such a control device which is simple in construction and which is actuated primarily through the inertia of one of the moving parts of the device.

Numerous other objects and advantages of the invention will be apparent as it is better understood from the following description, which, taken in connection with the accompanying drawings, discloses a preferred embodiment thereof.

Referring to the drawings:

Figure 1 is a vertical sectional view of the driving mechanism of a machine and a control device embodying the present invention associated therewith, with parts broken away;

Fig. 2 is an enlarged vertical sectional view of certain of the parts shown in Fig. 1, with said parts shown in a different position;

Fig. 3 is a fragmentary elevational end view taken substantially along the broken line 3—3 in Fig. 1, with parts broken away; and Fig. 4 is a fragmentary view in horizontal section taken substantially along the line 4—4 in Fig. 3, with parts shown in section.

As a preferred or exemplary embodiment of the instant invention the drawings illustrate an inertia actuated drive control device or mechanism A applied to a conventional machine B which may be any one of numerous kinds of machines in which an overload on the moving parts of the machine may be detrimental to the operation of the machine.

The drawings show the control device A applied to a driven member preferably a main driven shaft 11 of the machine B, the shaft 11 being journaled in a bearing 12 formed in a frame 13 which may be the main frame of the machine, although the control device A may be equally well applied to any other shaft or other moving part of the machine which is subject to the strains of an overload. The shaft 11 is rotated continuously, preferably by a driving member illustrated as comprising an electric motor 15 which is bolted to the frame 13. Said motor transmits its rotative power to the driven shaft 11 through a pair of pulleys 16, 17 keyed or fixedly mounted on the driven shaft 11 and the motor drive shaft respectively and connected by an endless belt 18. However a clutch or other source of power instead of the motor 15 could be used as a driving instrumentality to rotate the driven shaft 11. Where an electric motor is used, its operation is controlled by the control device A and in a similar manner any other source of power used in place of the motor is likewise controlled by the device A.

The control device A primarily comprises a stop actuating element or flywheel 21 which preferably is loosely mounted on the driven shaft 11 adjacent the drive pulley 16 therefor, said flywheel being freely rotatable on the shaft and laterally movable relative thereto along the shaft. The flywheel 21 is rotated with the shaft 11 preferably through a loose or yieldable connection therebetween, which yieldable connection may be directly with the shaft 11 or alternatively through a separate part carried on the shaft.

Preferably this yieldable connection comprises a tension spring 23 having one end secured to a pin 24 projecting laterally from a side of the flywheel 21. The opposite end of the spring 23 is connected to a pin 25 which projects laterally from a side of a disc 26 mounted on and keyed to the shaft 11 adjacent the flywheel 21. The pin 25 spans the space between the disc 26 and the flywheel 21 and extends into a clearance slot 27 formed in the side of the flywheel to provide a driving connection between the latter and the disc 26 fixed on shaft 11. The tension spring 23 normally holds the pin 25 in engagement with the leading end of the slot 27 and thus normally provides a loose and yieldable driving connection between the flywheel and the disc 26 fixedly mounted on the shaft 11 for rotating the flywheel with the shaft.

Thus as the shaft 11 rotates, it rotates disc 26 and through said pin and slot connection in turn rotates the flywheel 21 at the same speed as the shaft, thereby building up in the flywheel the property of matter known as inertia and momentum. When a jam or an overload in the machine occurs and puts a strain on the main shaft 11, the shaft tends to stop or lose speed, but the inertia and resulting undisturbed momentum of the flywheel tends to keep the flywheel in motion. Hence the flywheel runs ahead or tends to rotate forwardly on and relative to the driven shaft 11.

This action, through cam instrumentalities associated with the flywheel and the disc 26, shifts the flywheel laterally along the shaft 11 (toward the left as viewed in Fig. 1). For this purpose the flywheel 21 carries a plurality of cam or follower rollers 31 which are arranged in a circle concentric with the axis of the shaft 11 and which rollers normally are in arcuately spaced and radially aligned relation to a corresponding number of spheres or balls 32 imbedded in and projecting from the adjacent side of the disc 26. These balls 32 constitute cam projections on the disc and could if desired, be integral with the disc or in the absence of the disc could be carried by or formed directly on the shaft 11. A compression spring 34 interposed between the driving pulley 16 and the flywheel 21 exerts a pressure against the flywheel to keep the follower rollers 31 in engagement with the side of the disc 26.

Hence when the inertia in the flywheel 21 causes the flywheel to run ahead of the disc 26 by reason of an overload in the machine which slows rotation of shaft 11, the follower rollers 31 on the flywheel ride up onto the projecting surfaces of the cam balls 32 in the disc 26, and thereby push the flywheel 21 laterally away from the disc and along the shaft 11 against the resistance of the compression spring 34.

The thus induced lateral movement of the flywheel 21 to the left as viewed in Fig. 1, along the shaft 11, actuates a stop device connected with the electric motor, clutch or other source of rotative power for the shaft 11 and thereby effects the stopping of the machine so that damage to the machine parts will be prevented. In the embodiment disclosed, the described lateral bodily movement of the flywheel 21 rocks a stop switch actuating lever 36 which is mounted on a pivot pin 37 carried in a bracket 38 secured to the machine frame 13. One end of the lever 36 is held in constant engagement with the adjacent side of the flywheel by a tension spring 39 the opposite ends of which are respectively connected to the lever and the bracket. The opposite end of the lever 36 engages against the outwardly spring urged movable contact element 41 of a spring tensioned normally closed electric stop switch 42 in turn secured to the bracket 38.

The stop switch 42 is part of a main electric circuit which transmits electric current from a generator 43 (Fig. 1) for controlling the starting and stopping of the electric motor 15. This main electric circuit includes a wire 44 leading from the generator 43 to a normally open start or service switch 45, a wire 46 connecting the start switch 45 to the normally closed stop switch 42, a wire 47 from the stop switch 42 to and through a solenoid relay 48 controlling a normally open relay switch 49 of a holding circuit, a wire 51 from the solenoid to the motor 15 and a wire 52 from the motor to the generator. When the start switch 45 is manually closed, electric current from the generator 43 flows along the main electric circuit, starts the motor 15 and energizes the relay solenoid 48. Energization of the relay solenoid 48 closes the relay switch 49 and additionally closes the aforesaid holding circuit through wires 55, 56 which connect with the wires 44, 46 respectively to cut out the start switch 45 and hold the described main circuit closed when the start switch 45 is thereafter manually moved to open position. The driving motor 15 thus continues to operate as long as this holding circuit remains closed.

When an overload in the machine occurs and causes the flywheel 21 to shift bodily longitudinally along the drive shaft 11 as hereinabove described, the overrunning flywheel, due to its undisturbed momentum, rocks the stop actuating lever 36 in a counter-clockwise direction as viewed in Fig. 1 to open the stop switch 42 as shown in Fig. 2 and this breaks the holding circuit. This breaking of the holding circuit cuts off the source of electric current from the motor 15 and thereby effects the stopping of the motor and the machine driven thereby. Thus damage to the machine parts is prevented automatically when an overload occurs in the machine.

With the stopping of the machine, the drive shaft 11, its disc 26, and the flywheel 21 come to rest and the tension of spring 23 returns the flywheel from its advanced rotative position to its normal rotative position relative to the disc 26. This removes the follower rollers 31 from the cam balls 32 and thus permits the compression spring 34 to push the flywheel 21 outwardly (toward the right in Figs. 1 and 2) along the shaft 11 to its normal longitudinal position thereon. This recloses the stop switch 42 and thus resets or again establishes the entire control device, including the holding circuit and closed relay switch 49, for a subsequent stopping operation.

It should be understood that the running ahead or advance position of the flywheel 21 relative to the disc 26 under the effect of the inertia of the flywheel is only a partial rotation on the shaft 11 and at most is limited to the length of the clearance slot 27 in the flywheel. This limited relative travel of the flywheel however is sufficient to effect a riding-up of the follower rollers 31 onto the cam balls 32.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim.

1. An inertia actuated drive control for stopping a machine driving mechanism when an overload is encountered by the connected driven mechanism thereof, comprising a stop actuating member freely rotatable on a shaft of said driven mechanism and having means for rotating the same with said shaft for building up inertia in said actuating member, means interposed between said actuating member and said shaft for laterally shifting said actuating member on said shaft as a result of the inertia induced continued rotation of said actuating member when the rotation of said shaft is retarded by an overload encountered by the driven mechanism, and movable means responsive to the lateral shifting of said rotatable actuating member for stopping operation of said driving mechanism.

2. An inertia actuated drive control for stopping a machine driving mechanism when an overload is encountered by the connected driven mechanism thereof, comprising a flywheel slidably mounted and freely rotatable on a shaft of said driven mechanism and rotatable normally with the shaft for building up inertia in said flywheel, cooperating engageable cam means on said flywheel and shaft respectively for shifting said flywheel laterally along said shaft as a result of continued rotative inertia of said flywheel when the rotation of said shaft is retarded by an overload encountered by the driven mechanism, and movable means engageable by the laterally shifting flywheel for stopping operation of said driving mechanism.

3. An inertia actuated drive control for stopping a machine driving mechanism when an overload is encountered by the connected driven mechanism thereof, comprising a flywheel freely rotatably and slidably mounted on a shaft of said driven mechanism, a positively rotatable disc member on said shaft adjacent said flywheel, a spring tensioned pin and slot connection between said disc member and said flywheel for normally rotating the latter with said shaft to build up rotative inertia in said flywheel, a projecting cam member on one side of said flywheel engageable with a cooperating projecting cam member on the adjacent side of said disc member, spring pressure means engaging said flywheel for urging the same towards said disc member, the forward rotative inertia of said flywheel relative to the disc member under overload conditions encountered by the latter being limited by said pin and slot connection after said cooperating cam members are thus engaged to shift said flywheel laterally away from said disc member, and means engaged by said laterally shifting flywheel and connected with said driving mechanism for stopping operation thereof when such overload is encountered.

4. An inertia actuated drive control for stopping a machine driving mechanism when an overload is encountered by the connected driven mechanism thereof, comprising a flywheel freely mounted for sliding and rotative movement on and relative to a rotatable shaft of said driven mechanism, a pin and slot connection between said shaft and said flywheel for rotating the latter with said shaft to build up inertia in said flywheel to allow the same to rotate forwardly relative to the forward shaft rotation when said shaft is slowed by an encountered overload, cam means interposed between said flywheel and said shaft for shifting the flywheel longitudinally along said shaft when said overload is so encountered, and means engaged by said flywheel during its shifting movement for stopping operation of said driving mechanism.

5. An inertia actuated drive control for stopping a machine driving mechanism when an overload is encountered by the connected driven mechanism of the machine, comprising a flywheel freely rotatable and slidable on a shaft of said driven mechanism and having means for normally rotating said flywheel with said shaft for building up inertia in the flywheel, a cam member carried on said shaft, a cam roller carried on said flywheel for cooperation with said cam member for laterally shifting said flywheel on and relative to said shaft when the rotative speed of said shaft is retarded by encountering an overload, spring pressure means engaging against said flywheel for holding said cam member and roller in radial alignment for cooperative rotative engagement therebetween, and a pivotally mounted lever engageable by said laterally shifting flywheel and connected to said driving mechanism for stopping operation of the same when said driven member shaft encounters said overload.

6. An inertia actuated drive control for stopping a machine driving mechanism when an overload is encountered by the connected driven mechanism thereof, comprising a disc keyed to a rotatable shaft of said driven mechanism and rotatable with said shaft, said disc having a flat inner face, a flywheel freely mounted on said shaft adjacent said disc and having a driving slot therein, a pin secured in said disc and extending into said driving slot in said flywheel for rotating said flywheel with said shaft to build up inertia in said flywheel, a spring interposed between said flywheel and said pin for yieldably retaining said pin in driving connection with said flywheel, a cam ball embedded in said inner face of said disc and having a portion projecting outwardly therefrom, a cam follower roller mounted on said flywheel in circumferentially spaced and radially aligned relation to said cam ball for engagement therewith when the momentum of said flywheel rotates the same forwardly on and relative to said shaft as a result of the shaft rotation being retarded by a machine encountered overload, said cam roller and ball engagement being operative to shift said flywheel laterally along said shaft during said relative forward rotation of said flywheel, a compression spring surrounding said shaft and engaging said flywheel for yieldably retaining said cam roller and ball interengaged for the flywheel shifting operation, and movable means engaged by said flywheel during its lateral shifting movement for stopping operation of said driving means.

References Cited in the file of this patent

UNITED STATES PATENTS

| Number | Name | Date |
|---|---|---|
| 1,996,849 | Bauer | Apr. 9, 1935 |
| 2,387,533 | Schmucker | Oct. 23, 1945 |
| 2,536,319 | Slack | Jan. 2, 1951 |
| 2,580,298 | Hopkins et al. | Dec. 25, 1951 |